J. F. DITSWORTH.
Wagon-Brake.

No. 213,400.                Patented Mar. 18, 1879.

UNITED STATES PATENT OFFICE.

JOSIAH F. DITSWORTH, OF AUSTIN, NEVADA.

IMPROVEMENT IN WAGON-BRAKES.

Specification forming part of Letters Patent No. 213,400, dated March 18, 1879; application filed July 29, 1878.

*To all whom it may concern:*

Be it known that I, JOSIAH F. DITSWORTH, of Austin, county of Lander, and State of Nevada, have invented an Improved Wagon-Brake; and I do hereby declare the following to be a full, clear, and exact description thereof, reference being had to the accompanying drawings.

My invention relates to an improved wagon-brake; and consists in attaching to the rod connecting the brake-bar with the roller a case containing a spiral spring, through which the connecting-rod passes. A nut on the rod under the case bears against the spring when the brake is thrown on, so that in case a wheel is not perfectly round, and the high place on the wheel strikes the brake-shoe when the brake is on tight, there is no danger of breaking the rods or of locking the wheel in one place so as to wear out the tire at one point. Suitable nuts are placed in the connecting-rod for regulating the tension of the spring, and also for preventing the rod coming too far back in case the spring is broken or becomes too loose.

Figure 1:
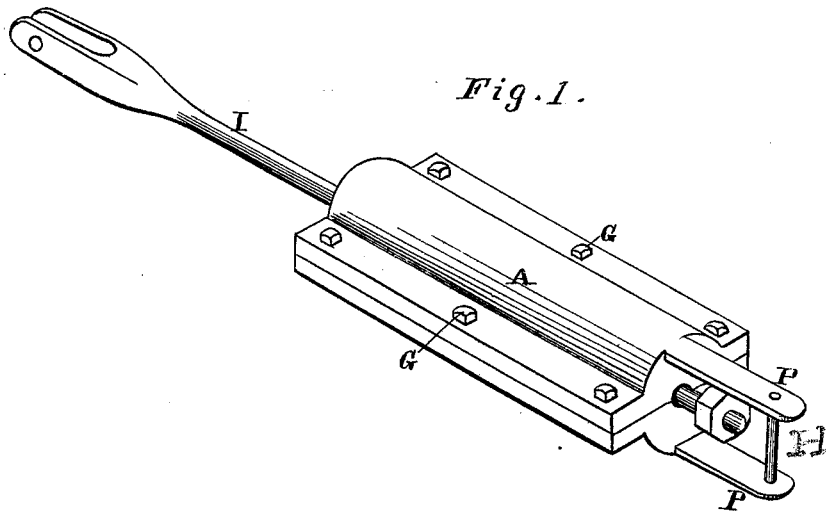
Figure 2:
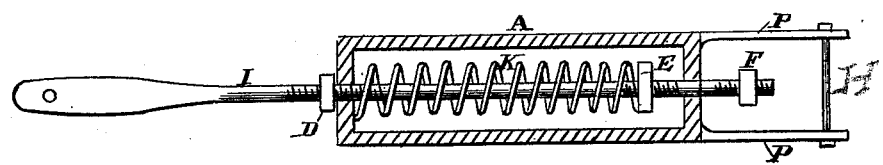
Figure 3:
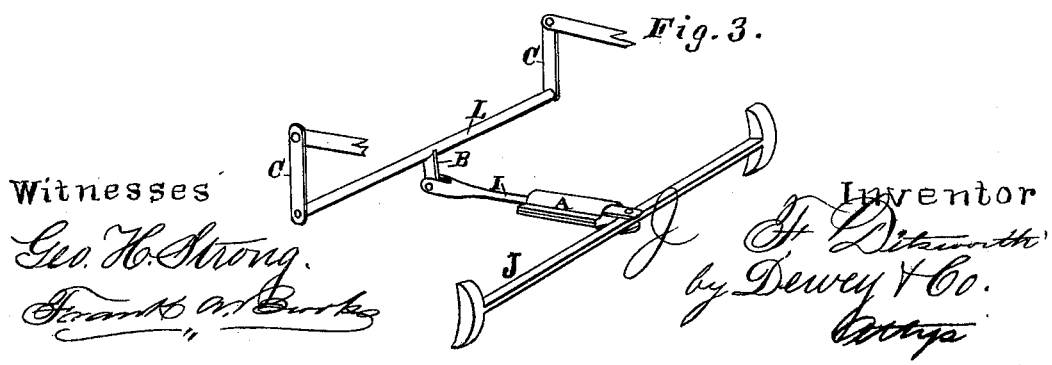

Referring to the accompanying drawings, Figure 1 is a perspective view of my device. Fig. 2 is a section. Fig. 3 shows its application.

Let A represent the shell containing the spiral spring K. This shell is made in two parts, connected together by bolts G through the flanges. These two sides are extended, as shown at P, so as to inclose the brake-bar J, and a bolt, H, connects the two parts P, so as to hold the shell to the brake-bar. A connecting-rod, I, is attached to the short arm B of the roller L, and passes back through the shell A, and through the center of the spiral spring K inside said shell. This connecting-rod has screw-threads formed on it for part of its length, as shown, so as to hold the nuts E and F in their proper position.

The nut D is placed on the connecting-rod behind and outside of the shell, and may be used for tightening or slacking the spring, as required.

E represents the nut on the rod which holds the pressure on the spring, for the purpose hereinafter described, and F is a nut outside and in front of the case, between the extensions P, which answers as a safety-stop to prevent the connecting-rod drawing too far through in case the spring K should break, and it also is used for regulating the play of the brake.

To the roller L is the long arm C and the usual rod R, connecting with the foot-lever for operating the brake.

The operation of my device is as follows: By applying the power to the usual lever in the vehicle, the rod R draws the long arm C of the roller L forward, thus throwing the short arm B back. This draws back the connecting-rod I, when the nut E bears against the spring K, thus drawing the brake-bar J back and forcing the brake-blocks against the wheels.

In case the spring is too loose, so that the nut E comes too far back, the nut F will bring up in the front end of the case and draw the brake-bar back; but the tension of the spring can easily be regulated by the nuts, as herein described.

With an ordinary brake the bar is connected to the roller by a solid connecting-rod running to the short arm of the roller.

In case the wheels are not perfectly round when the brake is on tight and the high place in the wheel strikes the block, the wheel will stop rotating, and the part of the tire on the ground will be subjected to unnecessary wear. The tire will, therefore, soon become worn through at that point. Again, when the wheel strikes the brake in the high place, it causes a jar on the brake, frequently causing the brake to give way. Very many of the accidents from brakes giving way have been occasioned by this defect.

With my improved brake, when the high place in the wheel strikes the brake-blocks, the spring in the case attached to the brake-bar will give enough to allow the high place to pass the blocks without causing the wheel to drag, saving the tires from wear, and causing no jar to the brake-rods when the brake is suddenly thrown on, and while its action is just as effective, it comes up with an easy motion and no jar. This method of connecting the brake-bar with the levers tends also to keep the wheels round, as wherever there is a tendency to bulge, there a greater pressure is exerted.

The spring, being inclosed in a shell, is out of the way of the dust and dirt, but is easily accessible for repair or replacement by separating the two sides of the shell.

This device is very simple of construction, easily attached, and involves no change in any parts of ordinary brakes, save in the rod connecting the brake-bar and roller.

Having thus described my invention, what I claim as new, and desire to secure by Letters Patent, is—

The containing-case A, bolted together, as shown, and inclosing the spring K, said case being secured to the brake-bar by the case-extensions P and the bolt H, and having the rod I, with its nuts D E and safety-nut F, in combination with the lever B, roller L, and brake of a wagon, substantially as and for the purpose herein described.

In witness whereof I hereunto set my hand and seal.

J. F. DITSWORTH. [L. S.]

Witnesses:
WILLIAM GIBSON,
WILLIAM HOMER CLARK.